US008690255B2

(12) United States Patent
Yamaki et al.

(10) Patent No.: US 8,690,255 B2
(45) Date of Patent: Apr. 8, 2014

(54) SEAT BACK FRAME

(75) Inventors: Jogen Yamaki, Utsunomiya (JP); Harutomi Nishide, Utsunomiya (JP); Yoshitomo Oka, Utsunomiya (JP); Kenichi Saito, Utsunomiya (JP); Yozo Furuta, Utsunomiya (JP); Hisato Oku, Utsunomiya (JP); Hiroshi Abe, Tokyo (JP); Munetoshi Nishihara, Tokyo (JP)

(73) Assignees: Honda Motor Co., Ltd., Tokyo (JP); Tachi-S Co., Ltd., Tokyo (JP)

( * ) Notice: Subject to any disclaimer, the term of this patent is extended or adjusted under 35 U.S.C. 154(b) by 256 days.

(21) Appl. No.: 13/152,710

(22) Filed: Jun. 3, 2011

(65) Prior Publication Data

US 2011/0298267 A1    Dec. 8, 2011

(30) Foreign Application Priority Data

Jun. 4, 2010    (JP) .................................. 2010-129224

(51) Int. Cl.
*B60N 2/427*    (2006.01)
*B60N 2/54*    (2006.01)

(52) U.S. Cl.
USPC ............ 297/452.52; 297/216.14; 297/452.18; 297/452.56

(58) Field of Classification Search
USPC ............... 297/284.4, 452.18, 452.52, 452.56, 297/216.13, 216.14
See application file for complete search history.

(56) References Cited

U.S. PATENT DOCUMENTS

| 3,241,879 | A | * | 3/1966 | Castello et al. ............ 297/284.6 |
| 4,283,046 | A | * | 8/1981 | Bowles, Jr. .................. 267/102 |
| 4,682,763 | A | * | 7/1987 | Kazaoka et al. ................ 267/89 |
| 4,697,848 | A | * | 10/1987 | Hattori et al. ............ 297/452.34 |
| 5,076,643 | A | * | 12/1991 | Colasanti et al. .......... 297/284.6 |
| 5,609,394 | A | * | 3/1997 | Ligon et al. ................ 297/284.4 |
| 6,375,267 | B1 | | 4/2002 | Ishikawa |
| 6,616,227 | B2 | * | 9/2003 | Blendea et al. ............ 297/284.4 |
| 8,235,467 | B2 | * | 8/2012 | Akutsu ....................... 297/284.4 |
| 2002/0195854 | A1 | * | 12/2002 | Hong .......................... 297/284.4 |
| 2009/0102270 | A1 | * | 4/2009 | Wissner et al. .......... 297/452.56 |

FOREIGN PATENT DOCUMENTS

| CN | 1814473 | 8/2006 |
| CN | 1986291 | 6/2007 |
| DE | 4213917 | 4/1996 |
| EP | 1329356 | 7/2003 |

(Continued)

OTHER PUBLICATIONS

Japanese Office Action, Application No. 2010-129224, mailed Apr. 10, 2012, six pages.

(Continued)

*Primary Examiner* — Peter Brown
(74) *Attorney, Agent, or Firm* — Rankin, Hill & Clark LLP

(57) ABSTRACT

A seat back frame for a seat of a vehicle includes: a pair of side frames placed at a left side and a right side in a width direction of a seat; a head rest supporting frame supporting a head rest; a supporting plate, a both ends of the supporting plate being connected to a lower portion of each of the side frames; an upper opening provided above the supporting plate, the upper opening being opened in a front-rear direction; a planar elastic body provided across the upper opening; and a connection member elastically connecting a lower portion of the planar elastic body and an upper portion of the supporting plate.

9 Claims, 12 Drawing Sheets

(56) References Cited

FOREIGN PATENT DOCUMENTS

| | | |
|---|---|---|
| JP | 58-121257 | 8/1983 |
| JP | 1085610 | 3/1989 |
| JP | 03-059227 U | 6/1991 |
| JP | 09-220951 | 8/1997 |
| JP | 10-181400 | 7/1998 |
| JP | 2000-025497 | 1/2000 |
| JP | 2004-016708 | 1/2004 |
| JP | 2010-083269 | 4/2010 |
| JP | 2010-247666 | 11/2010 |
| KR | 20040083962 | 10/2004 |

OTHER PUBLICATIONS

Office action filed in CN 201110153446.4 mailed Dec. 4, 2012.
Japanese Notice of Allowance for Application No. 2010-129224, mailed on Jul. 10, 2012, six pages.

* cited by examiner

SEAT BACK FRAME

BACKGROUND OF THE INVENTION

The present application claims priority on Japanese Patent Application No. 2010-129224, filed Jun. 4, 2010, the content of which is incorporated herein by reference.

1. Field of the Invention

The present invention relates to a seat back frame for a vehicle. The seat back frame comprises a feature such that a movement of an upper body of a passenger is controlled when an impact is entered from a rear part of the vehicle.

2. Description of the Related Art

A seat back frame for a vehicle is suggested in Japanese Unexamined Patent

Application, First Publication No. H10-181400 (hereinafter referred to as Patent Document 1). This seat back frame is provided at a position corresponding to an upper portion of the pelvis of a passenger seated on a seat. In order to quickly reduce the space between the head part of the passenger and the head rest when an impact load is entered from a rear part of the vehicle, the seat back frame comprises an upper pelvis supporting unit which supports the passenger from a back side. The seat back frame also comprises a chest part supporting unit which is provided at a position corresponding to a chest part of the passenger.

According to this seat back frame disclosed in Patent Document 1, a crushing load of the chest part supporting unit is set to be lower than a crushing load of the upper pelvis supporting unit. Therefore, when an impact enters from a rear part of the vehicle, the chest part supporting unit is first crushed. Then, the upper pelvis supporting unit is crushed. Therefore, the chest part and the head part of the passenger tilts towards a rear direction, with a hip part (upper portion of the pelvis) being a fulcrum point. As a result, the head part approaches the head rest at an early stage.

However, according to the configuration disclosed in Patent Document 1, the comfort level of the passenger sitting on the seat in normal instances was not very good. In other words, when the passenger sits back towards the seat back (seat back frame), the space between an upper rim part of the upper pelvis supporting unit and a lower rim part of the chest part supporting unit became concaved. As a result, the passenger will feel a concaved and convex terrain on the seat back. Therefore, there is a problem in that, when the passenger sits on the seat, the passenger may feel uncomfortable.

SUMMARY OF THE INVENTION

The present invention is made considering the problems described above.

Accordingly, the present invention aims to provide a seat back frame which can reduce the impact that a passenger receives from a seat when an impact is entered from a rear part of the vehicle. At the same time, the present invention aims to provide a seat back frame which can maintain the comfort level of a passenger who is sitting on a vehicle seat.

(1) Namely, a seat back frame for a seat of a vehicle according to an aspect of the present invention includes: a pair of side frames placed at a left side and a right side in a width direction of a seat; a head rest supporting frame supporting a head rest; a supporting plate, a both ends of the supporting plate being connected to a lower portion of each of the side frames; an upper opening provided above the supporting plate, the upper opening being opened in a front-rear direction; a planar elastic body provided across the upper opening; and a connection member elastically connecting a lower portion of the planar elastic body and an upper portion of the supporting plate.

(2) The above seat back frame may be configured as follows: The connection member includes a wire member connected to the pair of side frames. In addition, the wire member is elongated along the width direction of the seat.

(3) The above seat back frame may be configured as follows: A hook is provided to the supporting plate. This hook latches with the wire member.

According to the present invention described in (1), a planar elastic body and a connection member is elastically strung at an upper opening. Therefore, when an impact load is entered from a rear part of the vehicle, the lumber vertebra and the dorsal vertebra may be sunk into the upper opening without restricting the movement of the lumber vertebra and the dorsal vertebra to a rear direction. Therefore, the head part and the neck part of the passenger can approach the head rest at an early stage. Thus, the neck part of the passenger may be protected.

Further, while the lumbar vertebra and the dorsal vertebra are sunk into the upper opening, the head part and the neck part are pushed towards the head rest. As a result, the efficiency with which the impact is absorbed is enhanced. Thus, it is possible to reduce the impact being applied to the head part and the neck part of the passenger.

In particular, a connection member is elastically strung between the planar elastic body and the supporting plate. As a result, when the passenger sits back towards the seat back (seat back frame) in a normal instance, the connection member and the planar elastic body elastically deforms along the back surface of the passenger in the upper opening. Therefore, the passenger no longer feels a concaved and convex terrain at an upper rim part of the supporting plate. Thus, any discomfort is dissolved when the passenger sits down on the vehicle seat. In this way, it is possible to maintain a good comfort level.

According to the invention described in (2), the connection member comprises a wire member. As a result, the manufacturing cost may be lowered. Further, the connection member may be set up easily according to the layout of the planar elastic body and the supporting plate. Therefore, it is possible to increase the efficiency of manufacturing.

According to the invention described in (3), the wire member may be easily fixed to the supporting plate. Therefore, it is possible to further increase the efficiency of manufacturing.

DETAILED DESCRIPTION OF THE PREFERRED EMBODIMENTS

Hereinafter, an embodiment of the present invention is described based on the attached diagrams.

Figure 1:
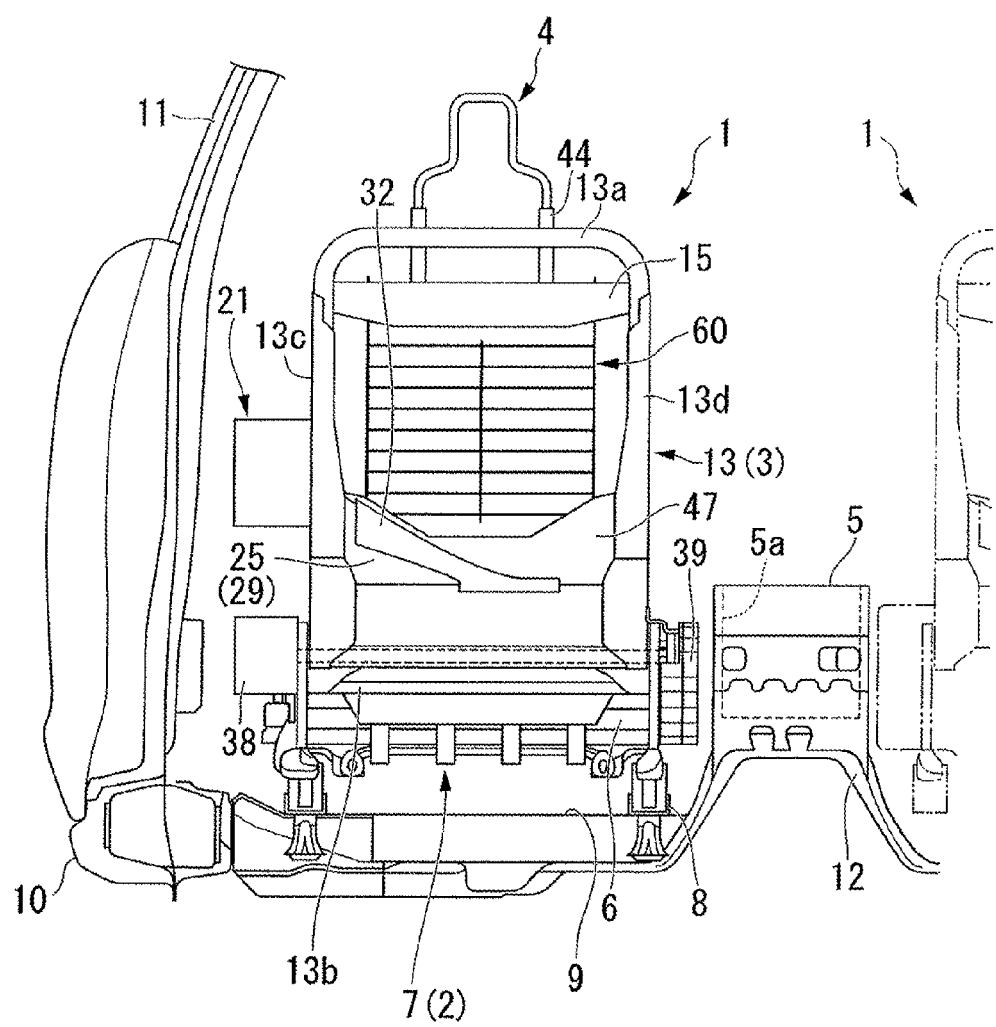
FIG. 1 is a rear side diagram showing a portion of a vehicle seat at a front seat in a left side of a vehicle chamber according to an embodiment of the present invention.

FIG. 1 is a diagram showing a rear side of a front seat at a left side of a vehicle chamber. According to the diagram, the arrow FR indicates a frontal direction of the vehicle. The arrow OUT indicates an outer side of the vehicle in a vehicle width direction.

As shown in FIG. 1, a floor tunnel 12 is formed on a vehicle body floor 9 at a central portion of a vehicle width direction. The floor tunnel is shaped so as to be concaved upward along a front-rear direction of the vehicle body. At both sides of the floor tunnel 12, a pair of left and right from seats 1, 1, are positioned separately from one another.

At an outer side of the left and right seats 1, 1 in the vehicle chamber, a side sill 10 is provided in a front-rear direction of the vehicle body. The side sill 10 is configured to be a closed structure in cross sectional view. The side sill 10 is grafted to a rim of the vehicle body floor 9 at both sides. A lower portion of a center pillar 11 is connected to this side sill 10. Here, FIG. 1 only shows a skeletal form of the seat 1 for ease of description. (This is true for other figures as well.)

A console box 5 is fixed on the floor tunnel 12 and between the left and right seats 1, 1. The console box 5 is configured so that a container unit 5a is provided at an upper surface side in a concaved manner.

Figure 2:
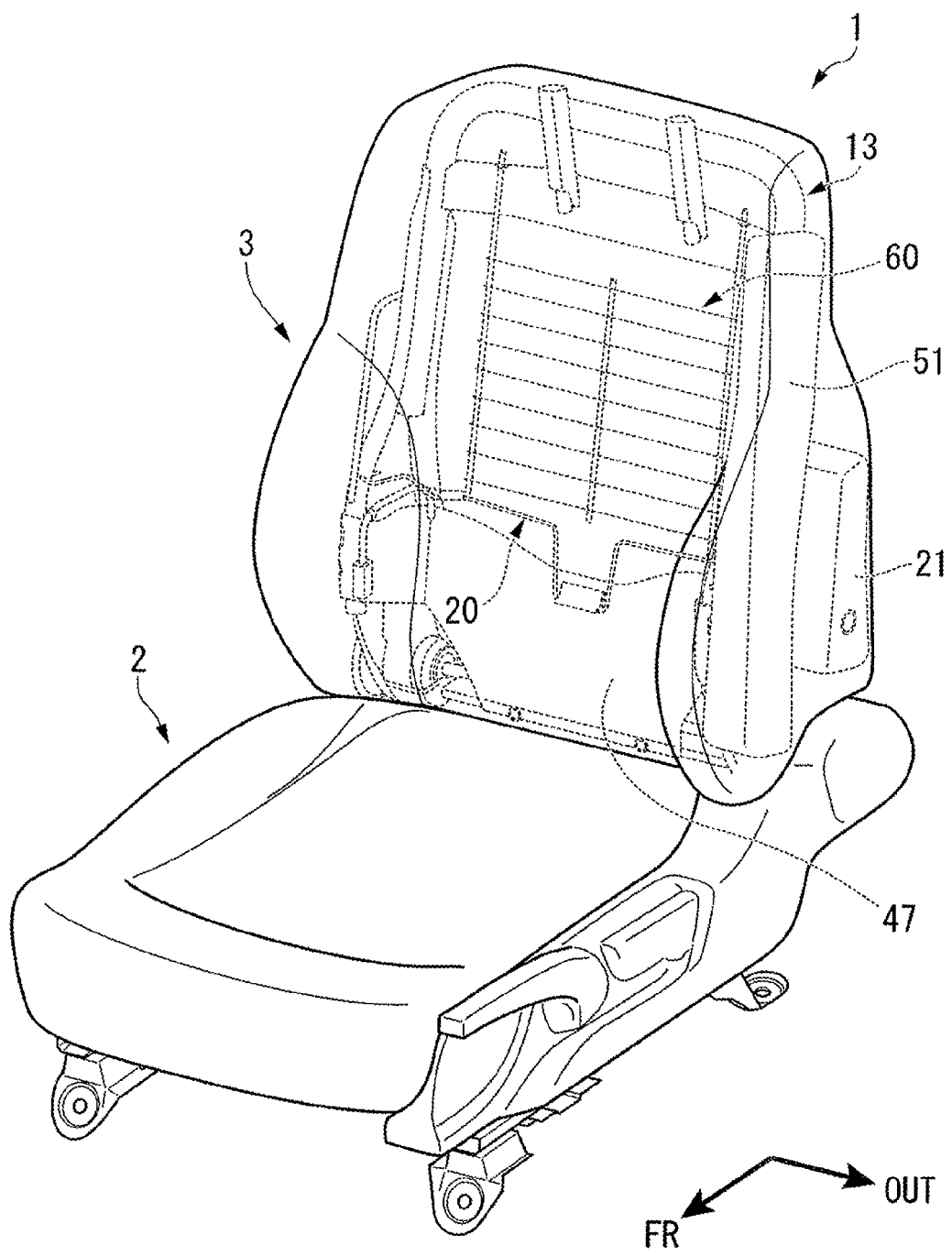
FIG. 2 is a perspective view of a vehicle seat according to an embodiment of the present invention seen from a slanted front side.
Figure 3:
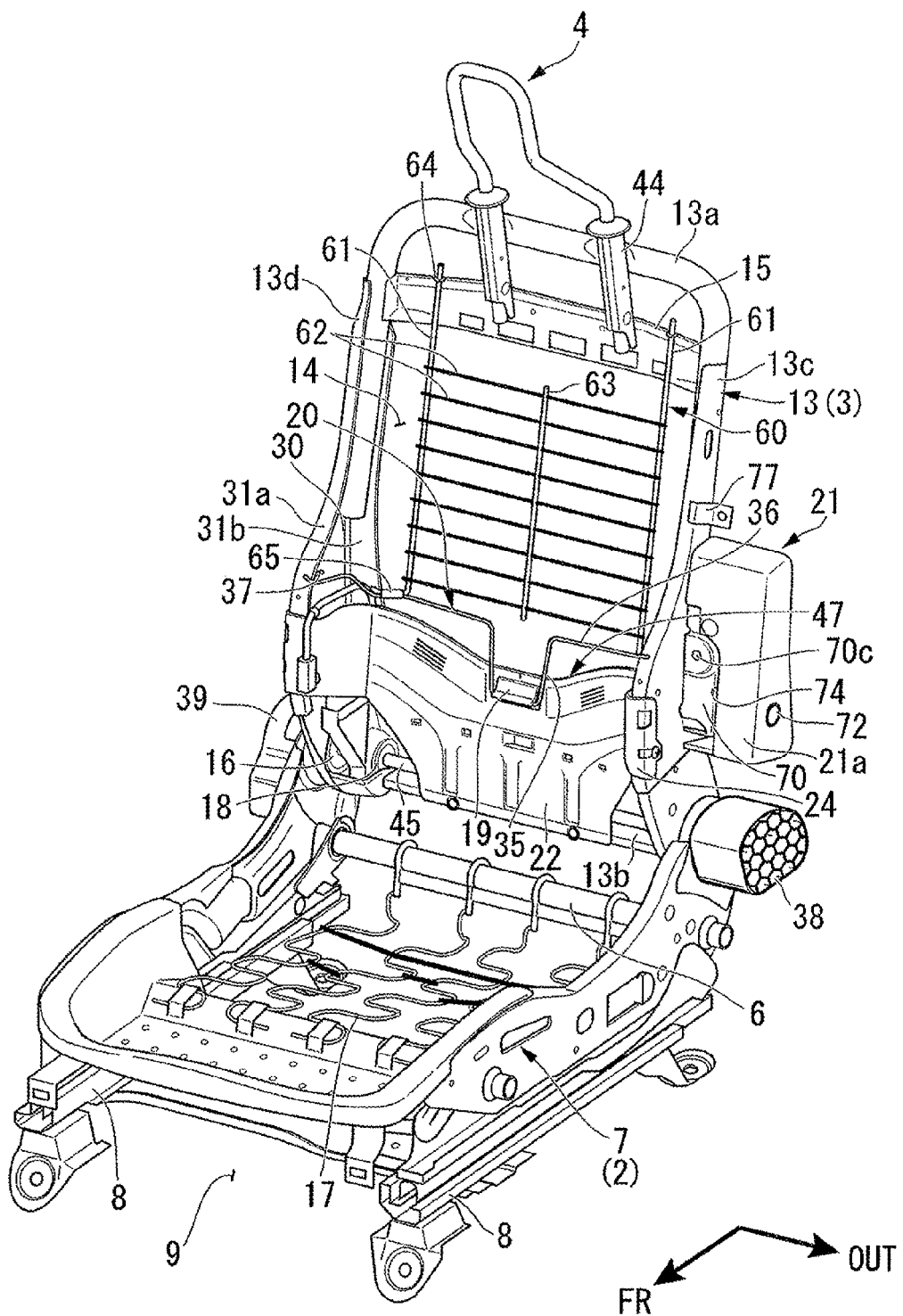
FIG. 3 is a perspective view of a skeletal part of a vehicle seat according to an aspect of the present invention seen from a slanted front side.

FIG. 2 is a perspective view of a vehicle seat 1 at a front side of the vehicle seen from a slanted front side direction. FIG. 3 is a perspective view of a skeletal part of the vehicle seat 1 seen also from a slanted front side direction. In the following description, a width direction is considered to be the same as a vehicle width direction (a seat width direction) unless otherwise noted.

As shown in FIG. 2, the vehicle seat 1 comprises a seat cushion 2, a seat back 3, and a head rest 4. A skeletal frame of the head rest 4 is only shown in FIG. 3. The seat cushion 2 supports a bottom part of a passenger. The seat back 3 is connected to a rear end of the seat cushion 2. The seat back 3 supports the hip part and a back part of the passenger. The head rest 4 is supported on an upper portion of the seat back 3. The head rest 4 supports a head part and a neck part of the passenger.

As shown in FIG. 3, the seat cushion 2 comprises a seat cushion frame 7. The seat cushion frame 7 is attached to the vehicle body floor 9 via a seat rail 8, 8 so that the seat cushion frame 7 may slide in a front-rear direction. A rear part cross member 6 is attached to the seat cushion frame 7 at the rear end. The rear part cross member 6 is elongated along a width direction.

The seat cushion frame 7 comprises a component with a U-shape. The left and right rear ends of the seat cushion frame 7 are elongated slightly towards a slanted upper direction. A cushion spring 17 is strung in an inner side of the seat cushion frame 7 (see FIG. 3).

(Structure of Seat Back Frame)

Figure 4:
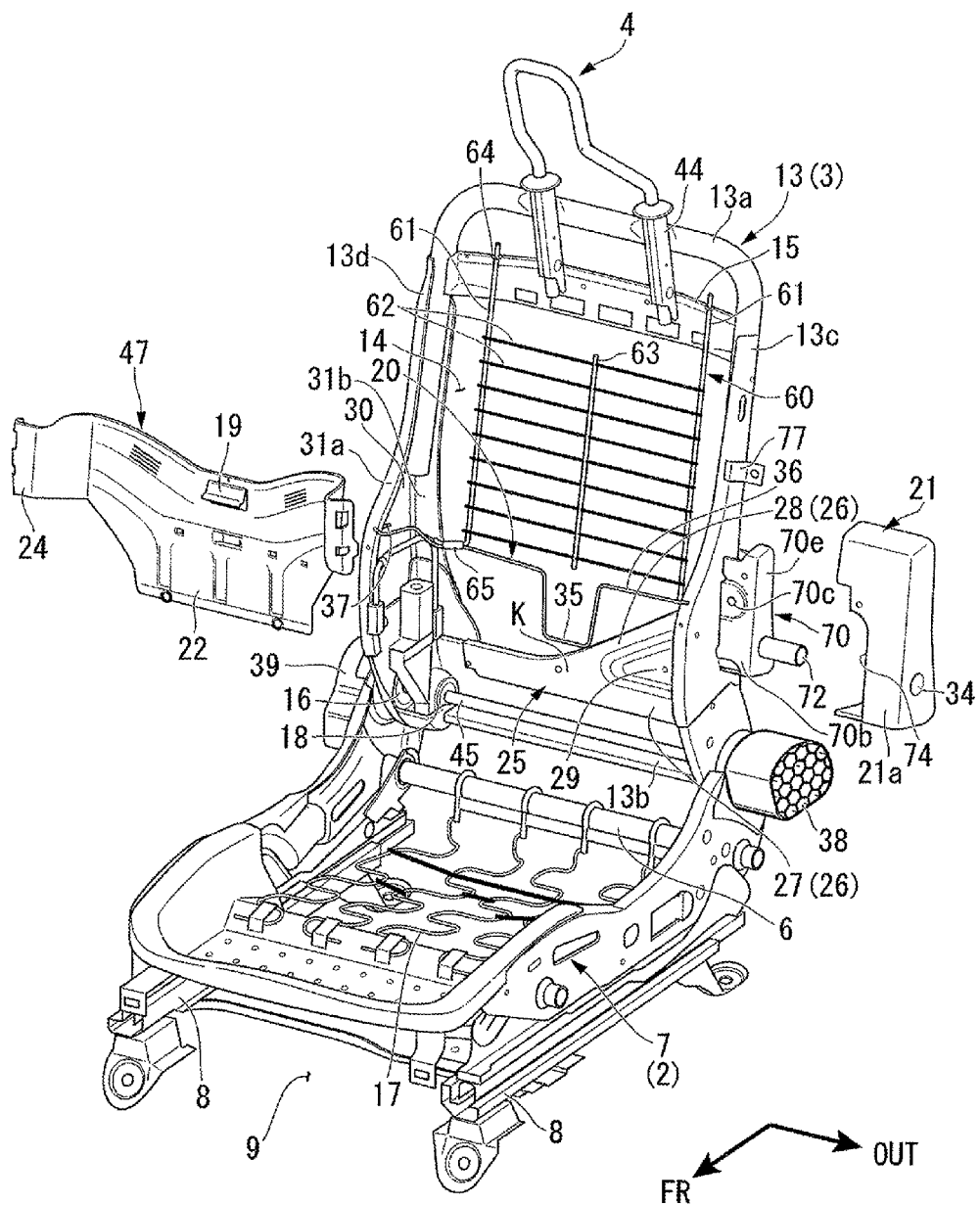
FIG. 4 is a broken down perspective view of a skeletal part of a seat back according to an aspect of the present invention.

FIG. 4 is a broken down perspective view of a skeletal part of a seat back frame 3.

As shown in FIGS. 3 and 4, the seat back 3 comprises a seat back frame 13. The seat back frame is shaped as a rectangular frame. The seat back frame 13 comprises an upper frame part 13a, a left and right side frame 13c, 13d, a lower frame part 13b. A lower end of the seat back frame 13 is connected to a rear end of the seat cushion frame 7 so that the seat back frame 13 may be tilted.

The upper frame part 13a comprises a pipe material being approximately U-shaped. A supporting pipe 44 is provided at a center of an upper side part being elongated in a width direction. The supporting pipe 44 supports a head rest 4 so that the head rest 4 may be elevated and lowered. Further, an upper portion cross member 15 is provided at the upper frame part 13a. The upper portion cross member 15 is placed so as to connect both ends of the upper frame part 13a in a width direction. The upper portion cross member 15 is curved towards the rear side from both sides of the width direction towards a central part. A base end side of the supporting pipe 44 is fixed to the upper portion cross member 15.

The left and right side frame 13c, 13d comprise a panel material. The cross section of the panel material is approximately U-shaped in a horizontal direction. A front-rear width is narrower in an upper side region compared to an approximately central part in an upper-lower direction. A front-rear width is relative wider at a lower side region compared to an approximately central part. An upper side region of the side frame 13c, 13d having a narrow front-rear width is welded and fixed to a corresponding side part of an upper frame part 13a so as to encompass the upper side part of the upper frame part 13a from an outer side of a width direction at the U-shaped cross sectional part. Further, a hinge part 16 and a reclining mechanism 18 are provided at a lower end side of the side frames 13c, 13d. The hinge part 16 is connected to a rear end of the seat cushion frame 7. The reclining mechanism 18 adjusts a tilting angle of the seat back frame 13. Incidentally, the left and right reclining mechanisms 18 are attached so that the left and right reclining mechanisms 18 may move in coordination with one another by an operating rod 45 which is elongated in the width direction.

The lower frame part 13b comprises a panel material. The cross section of the panel material in a vertical direction is approximately S-shaped. An upper half of the lower frame part 13b is elongated along the width direction so as to surround the operating rod 45 from a rear side. Both ends of the lower frame part 13b are connected to the lower ends of the left and right side frames 13c, 13d.

According to the left and right side frames 13c, 13d, a front wall 31a and a rear wall 31b are consecutively provided at a front and back of a side wall 30 at an outer side in the width direction. The front wall 31a and the rear wall 31b bend towards the inner side of the width direction. The side wall 30 is configured so that a width at an upper side is narrower compared to an approximately central part. The side wall 30 is also configured so that a width at a lower side is wider. In particular, the side wall 30 is configured so that a rear end side is approximately straight in all up and right regions. However, the front end side is formed to be straight from an upper portion to a central region in an upper and lower direction. From this central region towards a lower side, a front end side of the side wall 30 is curved so as to bulge gradually towards the front side. Therefore, a curved surface is provided at a front wall 31a of the side frames 13c, 13d. The curved surface is formed along a curved shape at a front end side of the side wall 30.

Figure 5:
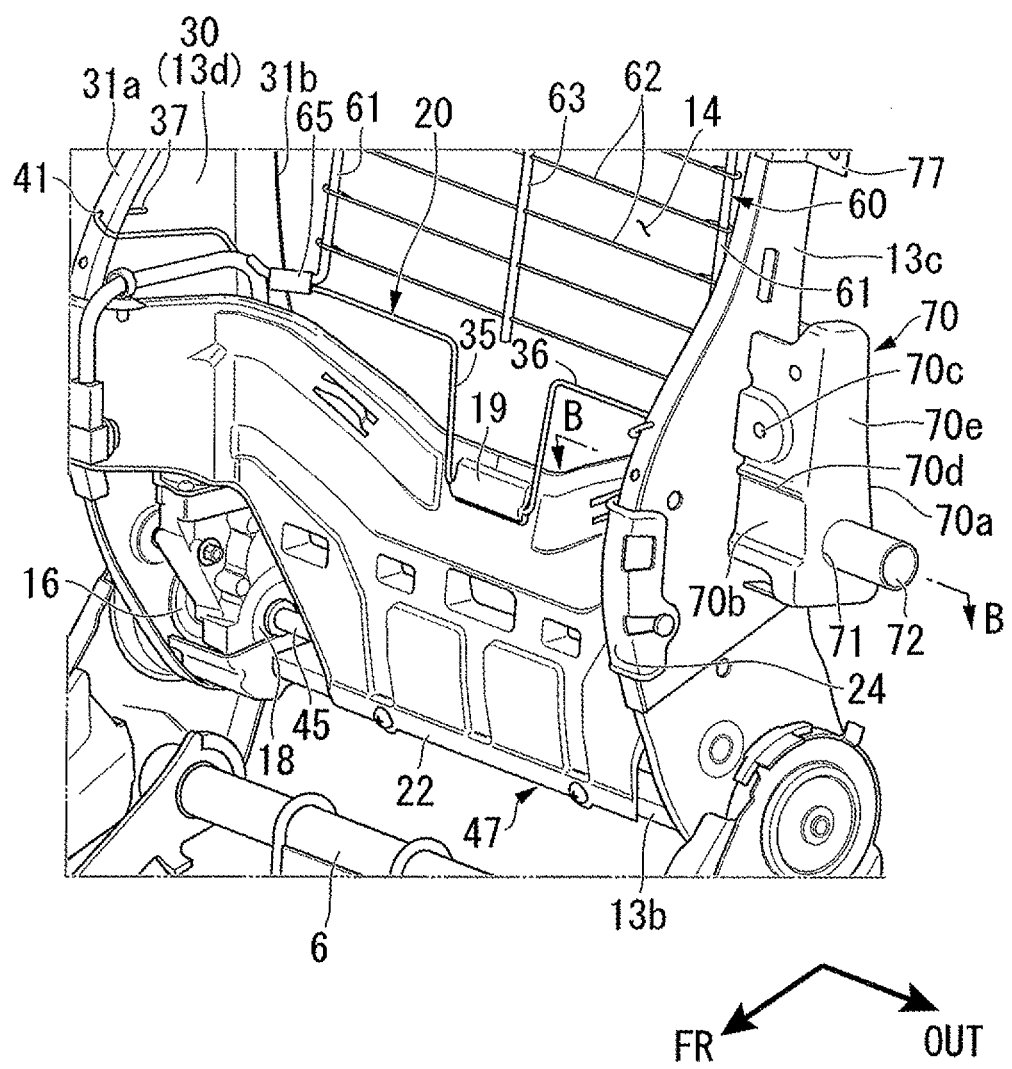
FIG. 5 is an enlarged perspective view of a skeletal part of a seat back according to an aspect of the present invention.

FIG. 5 is an enlarged perspective view of a skeletal structure of a seat back 3.

As shown in FIGS. 3 to 5, a back pan 47 is provided between the side frames 13c and 13d. The back pan 47 comprises, for example, a plate material made of resin which is formed to be curved in a three dimensional manner. In particular, the back pan 47 comprises pelvis supporting body 22 and a tip end 24. The pelvis supporting body 22 is formed so that a cross section in a horizontal direction is U-shaped. The tip end 24 is elongated from both sides of the pelvis supporting body 22. The tip end 24 is formed so as to be curved from a front wall 31a side of the side frames 13c, 13d towards an exterior surface of the side wall 30.

The pelvis supporting body 22 is elongated at a rear part side in the front-rear direction of the side frames 13c, 13d so as to be strung between the side frames 13c, 13d. Both sides of the pelvis supporting body 22 is elongated along an inner surface of the side wall 30 of the side frames 13c, 13d towards a frontal direction. In other words, when a passenger is sitting on the seat 1, the pelvis supporting body 22 provides support so as to surround the passenger from the pelvis towards a circumference of a lower portion of the lumbar vertebra from a rear side. At a central part in the width direction, a lower rim part is fixed to a lower frame part 13b with a screw and the like.

Further, the tip end 24 is fixed to an outer surface side of the side frames 13c, 13d with a screw and the like.

(Road Pass Structure)

Figure 6:
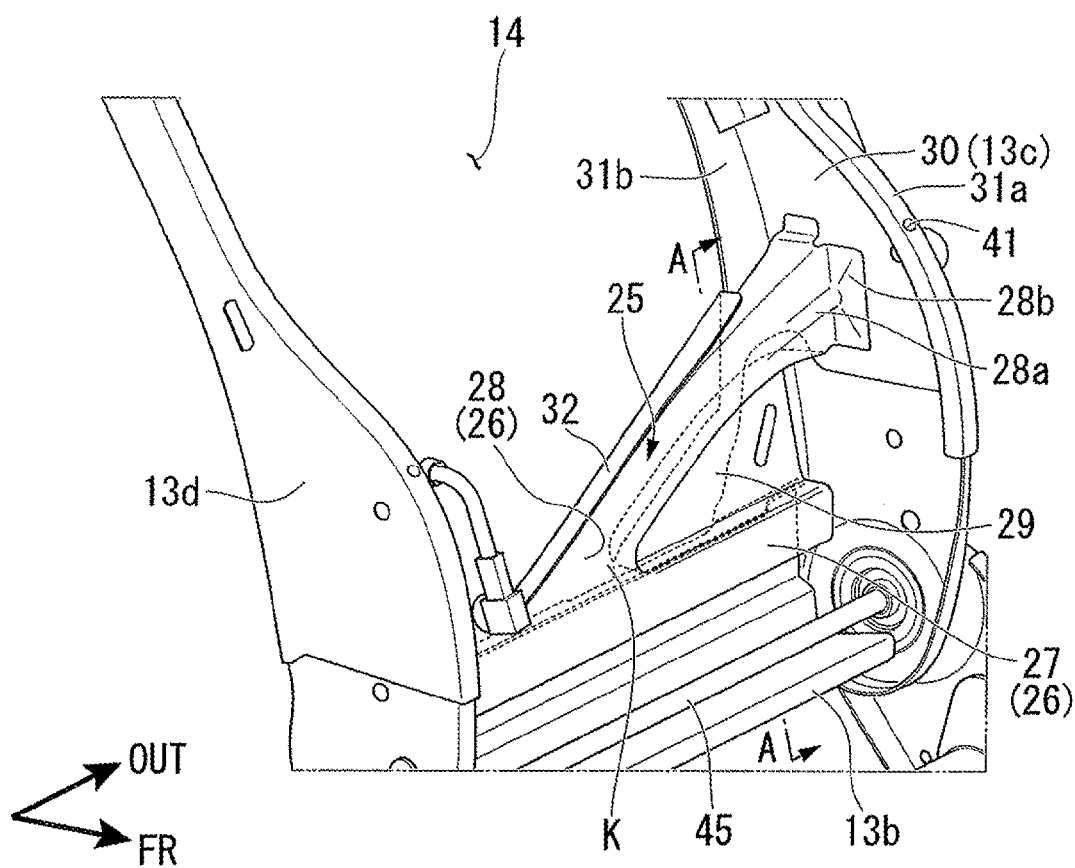
FIG. 6 is an enlarged perspective view of a skeletal part of a seat back according to an embodiment of the present invention when a back van is removed.
Figure 7:
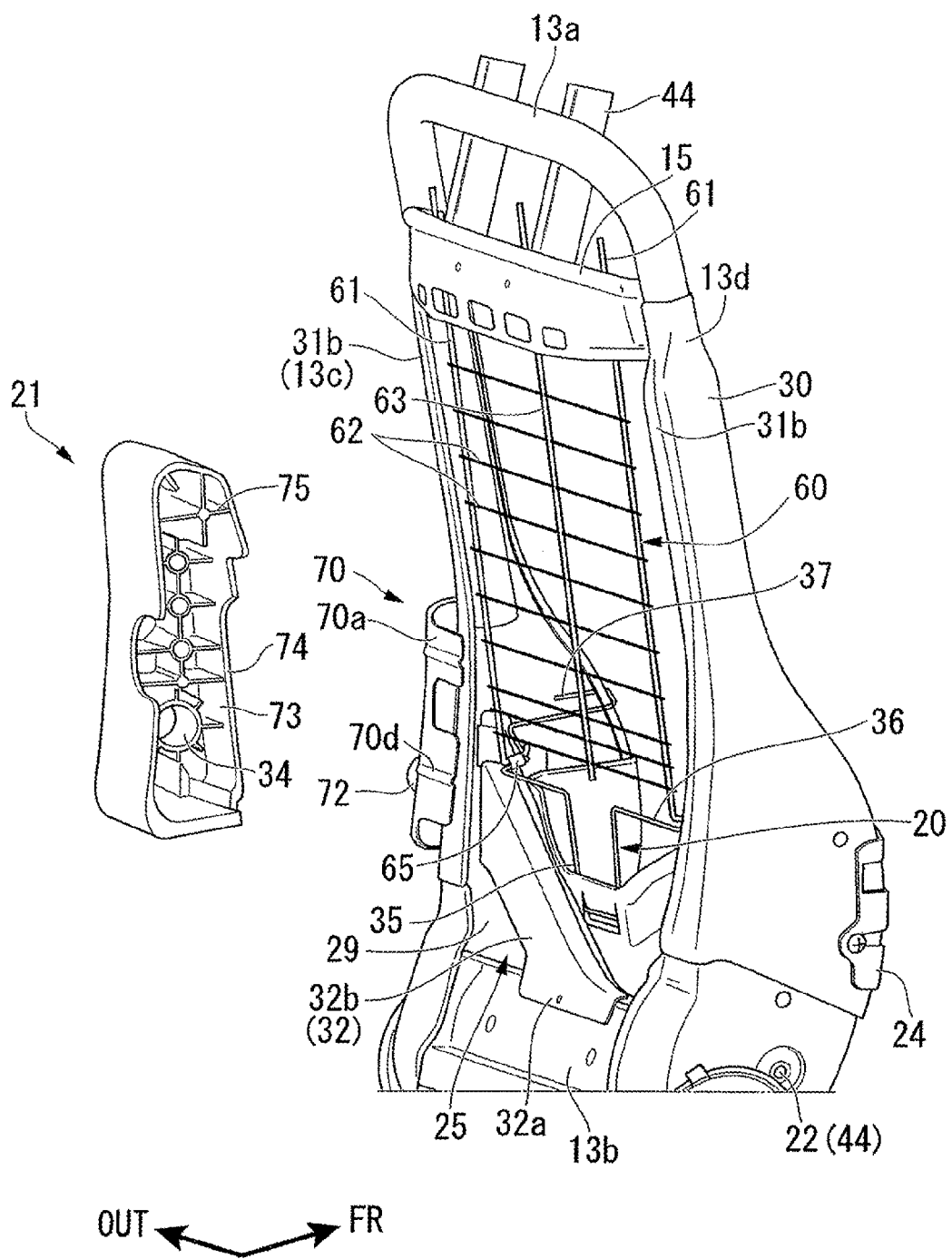
FIG. 7 is a perspective view of a skeletal part of a seat back according to an aspect of the present invention seen from a rear surface side.
Figure 8:
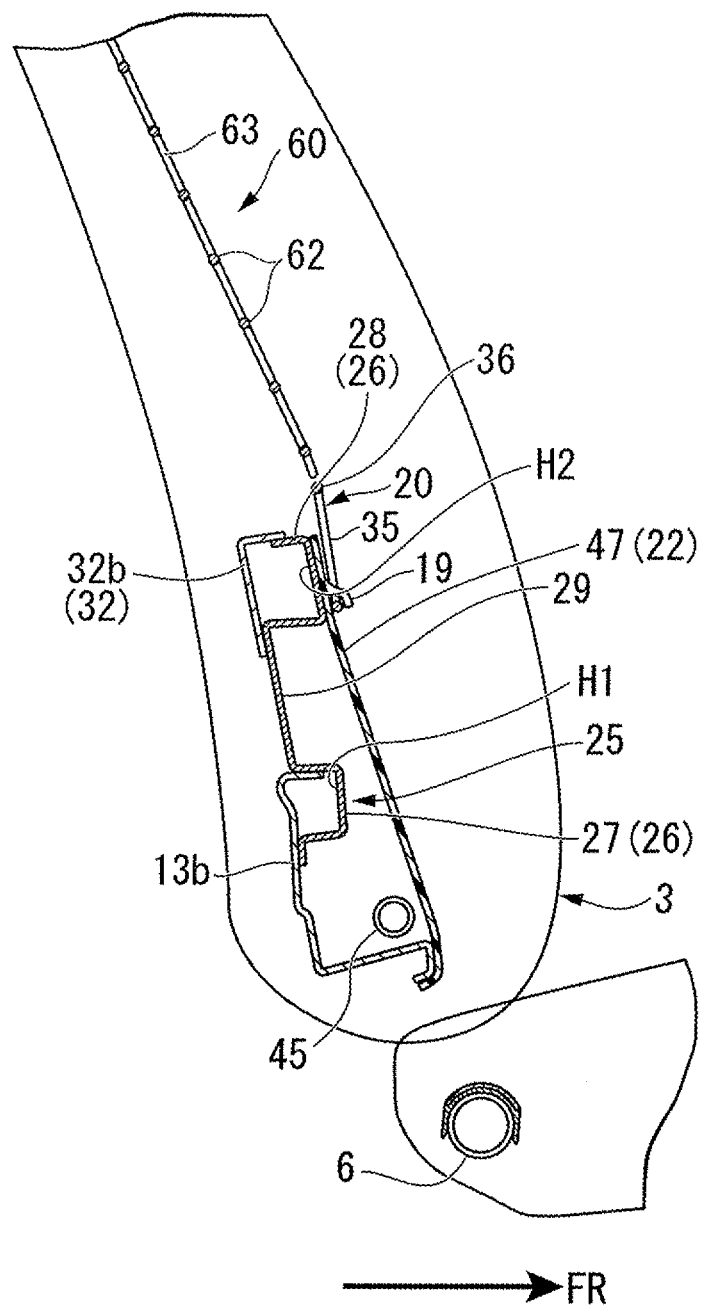
FIG. 8 is a cross sectional view along line A-A in FIG. 6.

FIG. 6 is an enlarged perspective view of a skeletal part of a seat back 3 when the back pan 47 is removed. FIG. 7 is a perspective view of the seat back 3 seen from a rear surface side. Further, FIG. 8 is a cross sectional view along line A-A of FIG. 6.

As shown in FIGS. 6 and 7, a load pass plate 25 is provided between the back pan 47 and a lower frame part 13b so that the load pass plate 25 overlaps with the back pan 47 in a front-rear direction. The load pass plate 25 is made of metal, for example. The load pass plate 25 is formed to be approximately a triangular form seen from a front-rear direction. In particular, the load pass plate 25 is formed so that a cross section of the load pass plate 25 is U-shaped from a vertical direction. The load pass plate 25 also comprises a channel part 26 which is elongated in an approximately Y-shaped form seen from a front-rear direction. The channel part 26 comprises a lower portion channel 27 and a slanted channel 28. The lower portion channel 27 is formed so as to be strung between the side frames 13c, 13d. The cross section of the lower portion channel 27 is U-shaped. The cross section of the slanted channel 28 is U-shaped. The slanted channel 28 is bifurcated from an intermediate portion of an elongating direction of the lower portion channel 27.

As shown in FIGS. 4, 6, 7, the lower portion channel 27 is placed so that an opening faces a rear direction. The cross section of the opening is U-shaped. The lower portion channel 27 is placed so as to be engaged with an upper half part of a lower frame part 13b. All regions of a lower rim part and an upper rim part of the lower portion channel 27 are welded and fixed to a lower frame part 13b. In particular, an upper rim part of the lower portion channel 27 is fixed to an upper rim part of the lower frame part 13b. Meanwhile, a lower rim part of the lower portion channel 27 is fixed to a front surface of the lower frame part 13b. As a result, the lower portion channel 27 and the lower frame part 13b form a structure with a closed cross section H1. The cross section of the structure H1 is rectangular. The structure with a closed cross section H1 is elongated between the side frames 13c, 13d in a width direction. Thus, the structure with a closed cross section H1 contributes to a transmission of a load between the side frames 13c and 13d.

Further, the lower portion channel 27 is configured so that an end at an outer side in the width direction is welded and fixed to an inner surface of a side wall 30 of the side frame 13c. Meanwhile, an end at an inner side in the width direction comprises a small space between an inner surface of a side wall 30 of a side frame 13d. In particular, an end of an inner side in the width direction of the lower portion channel 27 is elongated towards an inner side compared to a central part of a width direction of a lower frame part 13b. Seen from a front-rear direction, the end of the inner side in the width direction of the lower portion channel 27 is formed at a position so as to overlap with a rear wall 31b of a side frame 13d. In other words, the lower portion channel 27 and a lower frame part 13b are connected throughout approximately an entire region in the width direction of the lower frame part 13b. Therefore, according to the structure H1 having a closed cross section, an end of an outer side in the width direction contacts an inner surface of a side wall 30 of a side frame 13c. Meanwhile, an end of an inner side of the width direction comprises a small space between an inner surface of the side wall 30 of the side frame 13d. The lower portion channel 27 and the lower frame part 13b are connected in a range covering an end of an outer side of the width direction of the lower frame part 13b to an inner side compared to a central part of the width direction. The lower portion channel 27 and the lower frame part 13b overlaps with the lower frame part 13b in a front-rear direction in approximately an entire region covering a lower end of a lower portion channel 27.

The slanted channel 28 is continuously formed from the lower portion channel 27. The slanted channel 28 is elongated in an upper slanted direction from a bifurcation position K of the lower portion channel 27 towards an outer side of the width direction. An attaching chip 28b (see FIG. 6) is formed on an end at an outer side of the width direction of the slanted channel 28. The attaching chip 28b bends towards the outer side. This attaching chip 28b is fixed to an inner surface of the side wall 30 of the side frame 13c.

In this case, an end surface at an outer side of the width direction of the slanted channel 28 is placed so as to face a load transmission block 21 via the side frame 13c. The load transmission block 21 is described later. Incidentally, the slanted channel 28 is formed so that a width becomes broader towards an outer side of the width direction. At the same time, a bead 28a is formed on a peripheral surface of the slanted channel 28. The bead 28a bulges towards an outer side.

Furthermore, a planar part 29 is formed between the lower portion channel 27 and the slanted channel 28. The planar part 29 is integrally formed with each of the channels 27, 28. The planar part 29 provides a bridge between a region surrounded by an upper rim part of the lower portion channel 27 and a lower rim part of the slanted channel 28. As a result, the slanted channel 28 and the lower frame part 13b are connected in all regions in the elongating direction of the slanted channel 28 via the lower portion channel 27 and the planar part 29.

Furthermore, a reinforcing plate 32 is provided at a rear surface side of the load pass plate 25 so as to cover an opening of the slanted channel 28. The reinforcing plate 32 is a planar material formed in an L-shape in a cross sectional view in the orthogonal direction. The reinforcing plate 32 is formed so that an upper side of the reinforcing plate 32 is curved towards an upper rim part of the slanted channel 28. In particular, the reinforcing plate 32 comprises a base part 32a (see FIG. 7) and a slanted part 32b. A base end of the base part 32a is welded and fixed to a rear surface of the lower frame part 13b. The slanted part 32b is slanted along the slanted channel 28 towards an outer side of the width direction from a base part 32a. The slanted part 32b is configured so that an upper rim part of the slanted part 32b is welded and fixed throughout an entire region of the upper rim part of the slanted channel 28. At the same time, a lower rim part of the slanted part 32b is welded and fixed to a rear surface of the planar part 29. As a result, the reinforcing plate 32 and the slanted channel 28 form a structure part having a closed cross section H2 (see FIG. 8). The cross section of the structure part H2 is rectangular. The structure part H2 is elongated in an upper slanted direction from a bifurcation position K towards an outer side of the width direction. Thus, the structure part having a closed cross section H2 contributes to the transmission of a load between the side frames 13c, 13d.

In other words, according to the present embodiment, the structure part having a closed cross section H1 and the structure part having a closed cross section H2 are comprised between the side frames 13c, 13d. The structure part H1 is elongated in a width direction. The structure part H2 is bifurcated from the structure part H1. The H2 slants upward towards an outer side of the width direction. Two structures each having a closed cross section H1, H2 are provided in an orthogonal direction at an outer side of the width direction of the seat 1. Incidentally, a load pass structure is provided by the load pass plate 25, the lower frame part 13b, and the reinforcing plate 32.

(Planar Elastic Body and Supporting Body Wire)

Here, as shown in FIGS. 3 and 5, a supporting body wire (connection member) 20 and a planar elastic body 60 are provided between the back pan 47 and the upper cross member 15. The supporting body wire 20 and the planar elastic body 60 are provided on an opening (upper opening) 14 so as to provide a bridge between the back pan 47 and the upper cross member 15. The opening 14 is opened towards a front-rear direction.

First, for example, the supporting body wire 20 is a wire made of metal which is bent in a crank shape. The supporting body wire 20 is provided so as to provide an elastic bridge between a hook 19, and the side frames 13c, 13d. The hook 19 is formed on a pelvis supporting body 22 of the back pan 47. In particular, the supporting body wire 20 comprises a latching part 35 (see FIG. 4), an elongating part 36, and a returning part 37 (see FIG. 5). The latching part 35 is latchet to the hook 19 of the back pan 47. The elongating part 36 is elongated along a width direction from both sides of the latching part 35. The returning part 37 is formed on a tip of the elongating part 36. The returning part 37 is connected to each of the side frames 13c, 13d.

Incidentally, the hook 19 of the back pan 47, described above, is formed so thabove the pelvis supporting body 22 is elevated sharply. Thus, the hook 19 is a tongue-shaped member which is elongated towards a lower direction.

The latching part 35 is formed so that the latching part 35 is bent in an approximately U-shaped manner and is opened towards an upper direction. A bottom part of the latching part 35 is latched to the hook 19 of the back pan 47. Both ends of the bottom part are bent upwards.

The elongating part 36 is formed so that a base end side is elongated from both ends of the latching part 35 towards the side frames 13c, 13d. At the same time, a tip end side of the elongating part 36 is bent towards the front. The elongating part 36 is elongated along an inner surface of the side wall 30 of the side frames 13c, 13d.

The returning part 37 is formed so that a tip end side of the elongating part 36 is bent so as to return towards a rear side. The returning 37 is curved around the front wall 31a of the side frames 13c, 13d, and is inserted in the penetration hole 41 formed on the front wall 31a. As a result, both ends of the supporting body wire 20 are connected to the supporting frame parts 13c, 13d.

Furthermore, a planar elastic body 60 is provided between the supporting body wire 20 at the opening 14 and the upper portion cross member 15 described above. The planar elastic body 60 provides an elastic bridge between the supporting wire 20 and the upper portion cross member 15. The planar elastic body 60 comprises a metal wire placed in a reticular form between the upper cross member 15 and the supporting body wire 20. The planar elastic body 60 comprises a pair of bolster wires 61, a plurality of stringer wires 62, and a connection wire 63. The pair of bolster wires 61 provides a bridge between the upper portion cross member 15 and the supporting wire 20. The plurality of stringer wires 62 provides a bridge between the bolster wires 61. The connection wire 63 integrally connects each of the stringer wires 62.

Each bolster wire 61 is elongated parallel to one another in an orthogonal direction at both sides of the width direction of the seat 1. The bolster wire 61 is configured so that an upper end is inserted and fixed to each of the pair of attaching chips 64 formed on the upper portion cross member 15. Meanwhile, a lower end of the bolster wire 61 is integrated by an integrating member 65 along with each of the elongating members 36 of the supporting body wire 20. At this time, the bolster wire 61 and the supporting body wire 20 are integrated so that the bolster wire 61 and the supporting body wire 20 may move around each of the axial lines of the wires 20 and 61 within the integrating member 65.

Each stringer wire 62 is elongated along the width direction. Both ends of the string wires 62 are wounded around and fixed to each of the bolster wires 61. Each of the stringer wires 62 is aligned parallel to one another along an orthogonal direction. The pitch between each of the stringer wires 62 is set to be equal.

The connection wire 63 is elongated parallel to the bolster wire. The connection wire 63 is placed so as to connect the central parts of each stringer wire 62 in the elongating direction. The radius of the wires 61-63 is formed to be smaller than the radius of the supporting body wire 20 described above. Therefore, the planar elastic body 60 is formed to have a lower rigidity compared to the supporting body wire 20. In other words, the opening 14 of the seat back frame 13 according to the present embodiment is bridged by the supporting body wire 20 and the planar elastic body 60. The rigidity is set to be lower in the order from the planar back pan 47, the supporting body wire 20, to the planar elastic body 60.

(Load Transmission Member)

Figure 9:
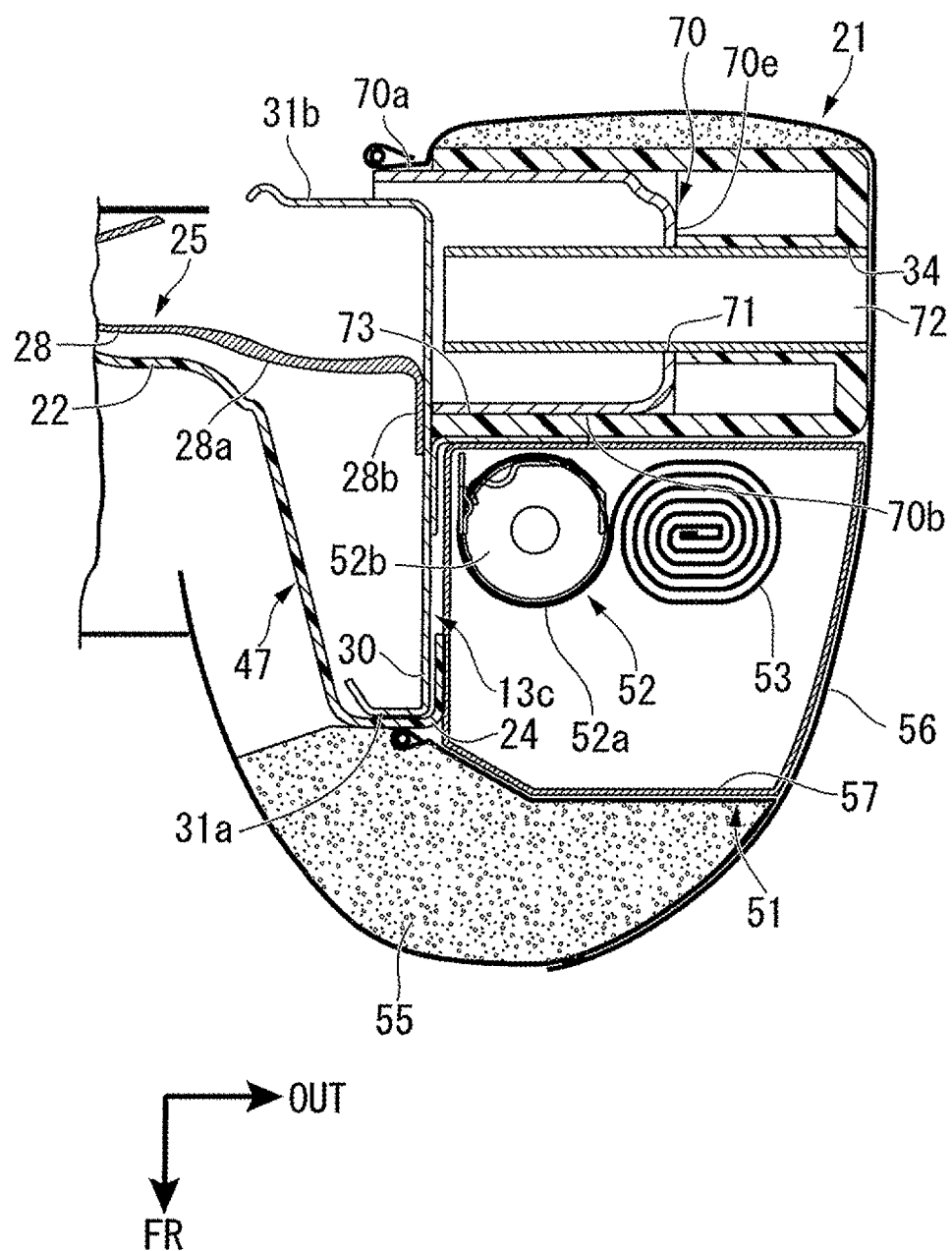
FIG. 9 is a cross sectional view along line B-B in FIG. 5.

FIG. 9 is a cross sectional view along line B-B of FIG. 5.

As shown in FIGS. 5, 7, 9, a protruding part 70 is provided on a side wall 30 at an outer side of the width direction of the side frame 13c. The protruding part 70 protrudes towards an outer side of the width direction. The protruding part 70 is formed to be a boxed-shape with a hollow inner space. The protruding part 70 opens towards an inner side of the width direction. The rear surface 70a is formed to be longer in a width direction compared to the front surface 70b. In other words, a tip end of the front surface 70b is in contact with a central part of a front-rear direction of a side wall 30 of a side frame 13c. Meanwhile, a tip end of the rear surface 70a is curved toward a rear wall 31b side of the side frame 13c. The tip end of the rear surface 70a is thus connected to the side frame 13c. In addition, an attaching hole 70c is provided at a front surface 70b of the protruding part 70. The attaching hole 70c is used to attach a side air bag device 51 which is described later. Incidentally, a bead 70b is formed at a peripheral surface of the protruding part 70. The bead 70d is elongated in the width direction. Thus, a configuration is made to restrict the buckling of the protruding part 70.

A penetration hole 71 is provided at a side surface 70e of the protruding part 70. A welding and fixing is made in a condition in which a cylindrical guide pipe 72 is inserted into this penetration hole 71. In other words, the guide pipe 72 is elongated along the width direction. Incidentally, a small space exists between an end surface of the guide pipe 72 in the axial direction and a side wall 30 of the side frame 13c.

As shown in FIGS. 4, 7, and 9, a load transmission block 21 is fixed to the guide pipe 72 in a condition such that the load transmission block 21 is fitted to the guide pipe 72. The load transmission block 21 is a component which transmits an impact load entered to the side wall of the vehicle body at the time of a side collision of the vehicle. The load transmission block 21 transmits this impact load to the side frame 13c. The load transmission block 21 is formed to be a honeycomb structure. A cylindrical cross section is placed in parallel by a plurality of ribs 75. The ribs 75 are elongated inside the load transmission block 21 in a width direction. The overall shape of the load transmission block 21 is formed by a resin to be a rectangular parallelepiped shape, elongated in an upper-lower direction. Further, the load transmission block 21 comprises a fitting hole 34. A guide pipe 72 is fitted to the fitting hole 34. The guide pipe 72 is provided on the side frame 13c. In a condition in which this fitting hole 34 is fitted to the guide pipe 72, the load transmission block 21 is fixed to the protruding part 70 with a screw and the like.

Furthermore, a container part 73 is provided at an inner side of the load transmission block 21. The container part 73 receives and stores the protruding part 70. As a result, the load transmission block 21 is attached so as to cover the protruding part 70 from an outer side of the width direction. In this case, the load transmission block 21 is fitted to the guide pipe 72 in a condition such that an end surface at an inner side of the width direction is in contact with the side wall 30 of the side frame 13c, and an end surface of the rib 75 at an inner side of the width direction is in contact with a side surface 70e of the protruding part 70. Further, when the load transmission block 21 is fitted to the protruding part 70, a cut out part 74 is provided at the front surface side of the load transmission block 21. The cut out part 74 exposes the front surface 70b including the attaching hole 70c of the protruding part 70.

When the load transmission block 21 is fixed in this way, the load transmission block 21 is protrudingly provided at a position leaning toward a rear side of the side wall 30 with respect to a center of the front-rear direction. Incidentally, according to this embodiment, the load transmission member comprises a guide pipe 72 and a load transmission block 21. Incidentally, the structure having a closed cross section H2 is placed at an opposite side of the load transmission member, with the side frame 13c being provided in between. The structure H2 comprises the slanted channel 28 and the reinforcing plate 32.

Further, as shown in FIGS. 2 and 9, a side air bag device 51 is provided in front of the load transmission block 21 at a side wall 30 of the side frame 13c. The side air bag 51 protects the passenger.

As shown in FIG. 9, the side air bag 51 comprises an inflator 52 and a bag body 53. The inflator 52 generates a gas once an impact is felt. A bag body 53 is folded up and is developed after receiving a gas pressure from the inflator 52. The side air bag 51, along with the inflator 52 and the bag body 53, are stored in a bag case 54. The bag case 54 comprises a lid part which may be opened and closed. In this condition, the side air bag 51 is attached to the side frame 13c.

As shown in FIG. 3, the inflator 52 comprises a cylindrical main body part 52a and a gas emission opening 52b. The main body part 52a is attached to the side frame 13c so that the main body part 52a is placed along a longitudinal direction of the side frame 13c. At a front side of the load transmission block 21, the inflator 52 is fixed to the support plate 77 and the attaching hole 70c of the protruding part 70 with a screw and the like. The support plate 77 is provided above the side frame 13c.

The bag body 53 is placed at an outer side of the width direction of the gas emission opening 52b of the inflator 52. At the same time, the bag body 53 is placed at a position facing the front surface 21a (the front surface 70b of the protruding part 70) of the load transmission block 21. In addition, the bag body 53 is folded up so that the bag body 53 is rolled up a plurality of times in a direction of the inflator 52 from a tip end side towards a base side. Therefore, when the bag body 53 receives a gas pressure from the inflator 52, the bag body 53 develops smoothly towards an outer side of the width direction and towards the front side of the vehicle body in a manner such that the winding of the bag body 53 is released from the base part. At this time, since the bag body 53 is facing the front surface 21a of the load transmission block 21 (a front surface 70b of the protruding part 70), the bag body 53 develops towards the front side along the side wall of the vehicle body such as the center pillar 11 and a door lining (not diagrammed) and the like. Here, the direction in which the bag body 53 develops is restricted by the front surface of the load transmission block 21 to be in the frontal direction of the vehicle. In other words, the load transmission block 21 and the front surface 21a, 70b of the protruding part 70 are used as supporting surfaces of the bag body 53.

Incidentally, the reference numeral 55 in FIG. 9 represent a padding material placed in a surrounding area of the seat back frame 13, a load transmission block 21, and a side air bag device 51. Reference numeral 56 represent a surface material covering an exterior surface of the padding material 55. According to the present embodiment, a slit-like opening 57 is provided on the padding material 55. The opening 57 opens towards the outer side of the width direction. A load transmission block 21 and a side airbag device 51 are placed inside the opening 57. When gas is supplied to the bag body 53 from the inflator 52 at a side collision, the bag body 53 pops out from the opening 57 towards the outside. The bag body 53 is developed towards the front by breaking the surface material 56 at a side part of the seat back 3.

Further, as shown in FIG. 9, the side air bag device 51 is provided at a position at an inner side compared to an end of an outer side of the width direction of the vehicle seat 1 (the tip end of the load transmission block 21). The side air bag device 51 is attached to the side frame 13c in a condition in which the bag body 53 is folded up. Therefore, a space is provided at a region at an outer side of the width direction at a frontal side of the load transmission block 21. Thus, it is possible to use this space effectively.

Further, as shown in FIG. 4, load transmission blocks 38, 39 are respectively attached to an outer side of the reclining mechanism 18 (an outer side of the width direction) at a lower end of the side frames 13c, 13d at both the left and right sides. Similar to the load transmission block 21 at the upper side, each of the load transmission blocks 38, 39 are formed to be a honeycomb structure. According to the load transmission blocks 38 and 39, a plurality of cylindrical cross sections elongated in the width direction are placed in parallel to each other. Further, the load transmission block 39 attached to the side frame 13*d* at an inner side of the width direction faces a side surface of the console box 5 at a center of the width direction.

(Operation)
(At the Time of a Side Collision)

According to the configuration described above, when an impact load enters a side part of the vehicle body at the time of a side collision of the vehicle, a sensor senses the impact, and the inflator 52 of the side air bag device 51 emits a gas.

The gas emitted by the inflator 52 is supplied to the bag body 53. The bag body 53 breaks the surface material 56 of the side part of the seat 1, and protrudes towards the front from a side part of the seat 1. As a result, the bag body 53 develops between a passenger seated on the seat 1 and a side wall of the vehicle body.

At this time, according to the vehicle seat 1 based on the present embodiment, the bag body 53 is placed at a position facing the front surfaces 21*b*, 70*b* of the load transmission block 21 (the protruding body 70). As a result, the front surfaces 21*b*, 70*b* are used as supporting surfaces of the bag body 53. In other words, a reaction force occurring at the time when the bag body 53 develops may be received reliably by the load transmission block 21 (protruding part 70). As a result, the bag body 53 may be developed at a greater speed.

In addition, at the time of a side collision of a vehicle, when a side wall of the vehicle body such as the center pillar 11 is deformed towards the direction of the seat back 3 (inner side of the width direction), the side surface comes in contact with the load transmission blocks 21 and 38 at a side part of the vehicle seat 1. Load is thus entered into these load transmission blocks 21 and 38.

First, when load is entered to the lower load transmission block 38, the seat 1 moves towards an inner side of the width direction in its entirety. At the same time, the load transmission block 39 at a lower inner side of the width direction comes in contact with the console box 5. At this time, the load is transmitted to an inner side of the width direction via the structure body having a closed cross section H1 comprising a lower frame part 13*b* of the seat back frame 13 and a lower portion channel 27 of the load pass plate 25. Thereafter, the load, which was transmitted to the structure body having a closed cross section H1, is transmitted to the lower frame part 13*b* from an end of the inner side of the width direction of the structure body having a closed cross section H1. Further, the load is transmitted to the side frame 13*d* at an inner side of the width direction via the lower frame part 13*b*. Further, the load, which was transmitted to the side frame 13*d*, is transmitted to the floor tunnel 12 via the load transmission block 39 and the console box 5. At this time, by forming the structure body having a closed cross section H1, it is possible to enhance the bending rigidity of the load pass structure. It is also possible to prevent the seat back frame 13 from being deformed. In this way, the impact load may be transmitted to the console box 5 in an effective manner.

Further, when an impact load is entered to the upper load transmission block 21, the load is transmitted from the load transmission block 21 to a side frame 13*c* at an outer side of the width direction of the seat back frame 13 from a directly lateral direction.

Further, the load, which was transmitted to the side frame 13*c*, is transmitted to the structure having a closed cross section H2 comprising the tilted channel 28 and the reinforcing plate 32. Thereafter, the load is transmitted to a lower diagonal direction towards an inner side of the width direction. In more detail, the load is transmitted to the structure having a closed cross section H2. Then, the load passes through all areas of the structure having a closed cross section H2 and the planar part 29, and is transmitted to the structure having a closed cross section H1. Then, the load is transmitted to the lower frame part 13*b* from an end of the inner side of the width direction of the structure having a closed cross section H1. The load is then transmitted to the side frame 13*d* at an inner side of the width direction via the lower frame part 13*b*. Further, the load is transmitted to the floor tunnel 12 via the load transmission block 39 and the console box 5.

In this way, the impact load which was entered to the load transmission block 21 is received by approximately all of the region of the load pass plate 25. Thus, the load is dispersed throughout the entire region of the load pass plate 25. Then, the load passes to the side frame 13*d* at an inner side via the lower frame part 13*b*. At this time, since the structures having a closed cross section H1 and H2 are formed between the side frames 13*c* and 13*d*, it is possible to enhance the bending rigidity of the load pass structure. In addition, the seat back frame 13 is prevented from being deformed. As a result, it is possible to transmit the impact load to the console box 5 in an effective manner.

Here, according to the present embodiment, the load transmission block 21 is fitted to the guide pipe 72. At the same time, the load transmission block 21 is fixed so as to cover the protruding part 70 being a box-like form. As a result, even when an impact load is entered to the load transmission block 21 from a slanted front direction or a slanted back direction (a direction intersecting the width direction) of the vehicle body, it is possible to transmit the load towards an inner side of the width body without the position of the load transmission block 21 being replaced.

(At the Time of a Rear End Collision)

Figure 10:
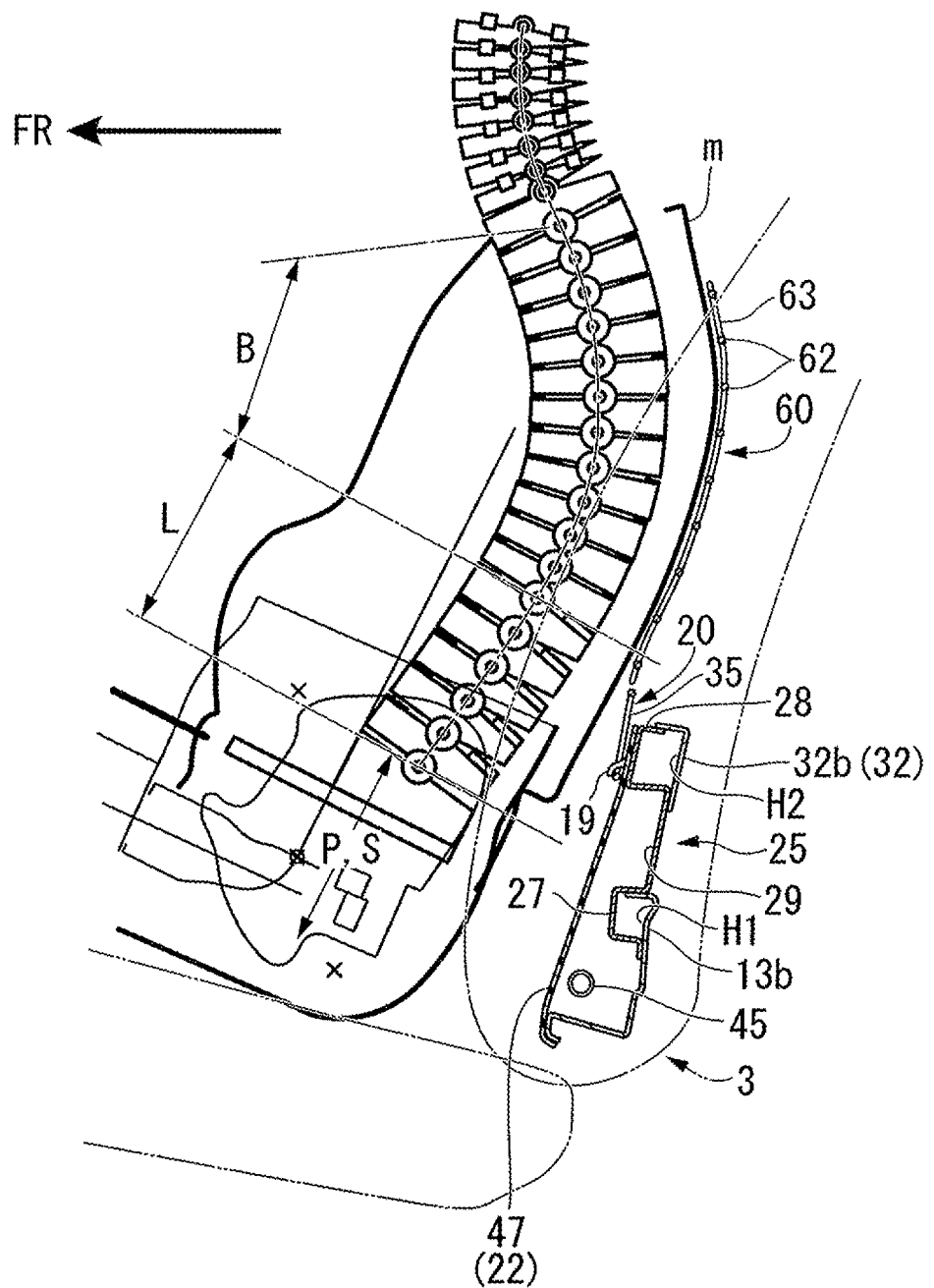
FIG. 10 is a cross sectional view corresponding to FIG. 8, and shows an instance of a collision at a rear part.

FIG. 10 is a cross sectional view corresponding to FIG. 8. FIG. 10 shows an instance in which a rear end collision has occurred.

First, according to FIG. 10, in a normal condition, when a passenger m sits on the seat 1, the pelvis supporting body 22 of the back pan 47 provides support to the pelvis P, the sacral bone S, to an area surrounding a lower portion of the lumbar vertebra L. In addition, the supporting body wire 20 supports an area surrounding an upper portion of the lumbar vertebra L. Furthermore, the planar elastic body 60 supports an area surrounding the dorsal vertebra B.

In this condition, when an impact load enters from a rear part of the vehicle, the passenger m moves towards a rear side of the vehicle in a condition in which the head part of the passenger m is lowered. At this time, the back pan 47 is hardly deformed. First, the supporting body wire 20 and the planar elastic body 60 are elastically deformed. In more detail, the supporting body wire 20 and the planar elastic body 60 are elastically deformed so as to bounce towards a rear side. As a result, the passenger m sinks into the seat back 3. At this time, the lumbar vertebra L and the dorsal vertebra B are not prevented from moving towards a rear direction. In other words, an upper half body of the passenger m falls towards a rear side, with an upper portion of the lumbar vertebra L being the center. Thereafter, the head part and the cervical part (neither of which are diagrammed) of the passenger are tilted as if the head part and the cervical part are rising. Thus, the head part and the cervical part are pressed to the head rest 4.

In this instance, the planar elastic body 60 is configured to have a lower rigidity compared to the supporting body wire 20. Therefore, when the passenger m tilts over, the planar elastic body 60 undergoes a greater elastic deformation towards a rear side compared to the supporting body wire 20.

In other words, an upper portion of the lumbar vertebra L is sunk further down. Therefore, when the passenger m tilts over backwards, the cervical part may be pressed to the head rest 4 while a portion from the lumbar vertebra L to the dorsal vertebra B of the passenger m is raised gradually. In this way, it is possible to enhance the efficiency with which the impact is absorbed. Incidentally, when the impact load is relatively large, the back pan 47 also deforms towards the rear side after the supporting body wire 20 and the planar elastic body 60 are deformed. As a result, the efficiency with which the impact is absorbed may be further enhanced.

In this way, according to the present embodiment, the planar elastic body 60 and the supporting body wire 20 are elastically placed across the opening 14 between the upper cross member 15 and the back pan 47. As a result, when an impact load is entered from a rear part of the vehicle, the lumbar vertebra L and the dorsal vertebra B may be sunk into the seat back 3 without restricting the movement of the lumbar vertebra L and the dorsal vertebra B towards the rear side. Therefore, the head part and the cervical part may be put to close proximity with the head rest 4 quickly at an early stage. As a result, the cervical part of the passenger m may be protected.

Furthermore, since the head part and the cervical part are pressed towards the head rest 4 while the lumbar vertebra L and the dorsal vertebra B are sunk into the seat back 3, it is possible to improve the efficiency with which the impact is absorbed. At the same time, it is possible to reduce the amount of impact being applied to the head part and the cervical part of the passenger m.

In particular, according to the present embodiment, the supporting body wire 20 is elastically placed between the planar elastic body 60 and the back pan 47. The supporting body wire 20 has a greater rigidity compared to the rigidity of the planar elastic body 60. Meanwhile, the supporting body wire 20 has a lower rigidity compared to the back pan 47.

According to the present embodiment, in a normal condition, when the passenger m is sitting deep in the seat back 3, the supporting body wire 20 and the planar elastic body 60 undergoes a flexible, elastic deformation along a back surface of the passenger m, within the opening 14 between the back pan 47 and the upper cross member 15. As a result, the passenger m hardly feels a concaved and convex terrain due to the upper rim part of the back pan 47. Thus, any discomfort is removed when the passenger sits down. Therefore, it is possible to maintain a good comfort level of the passenger sitting down.

Further, the rigidity becomes low in the order from the back pan 47 towards the planar elastic body 60. Therefore, it is possible to create an alignment along the back surface of the passenger m. Thus, the concaved and convex terrain at the seat back 3 may be removed reliably.

Further, the supporting body wire 20 comprises a metallic wire. As a result, the manufacturing cost may be lowered. In addition, an assembly may be made easily in accordance with a layout of the planar elastic body 60 and the back pan 47. Hence, it is possible to enhance the efficiency of manufacturing.

Further, a hook 19 is formed on the back pan 47. As a result, the supporting body wire 20 may be attached easily to the back pan 47. Thus, the efficiency of manufacturing may be enhanced even further.

While a preferred embodiment of the present invention has been described above, it should be understood that these are exemplary of the invention and are not to be considered as limiting the present invention. Additions, omissions, substitutions, and other modifications can be made without departing from the scope of the present invention.

Figure 11:
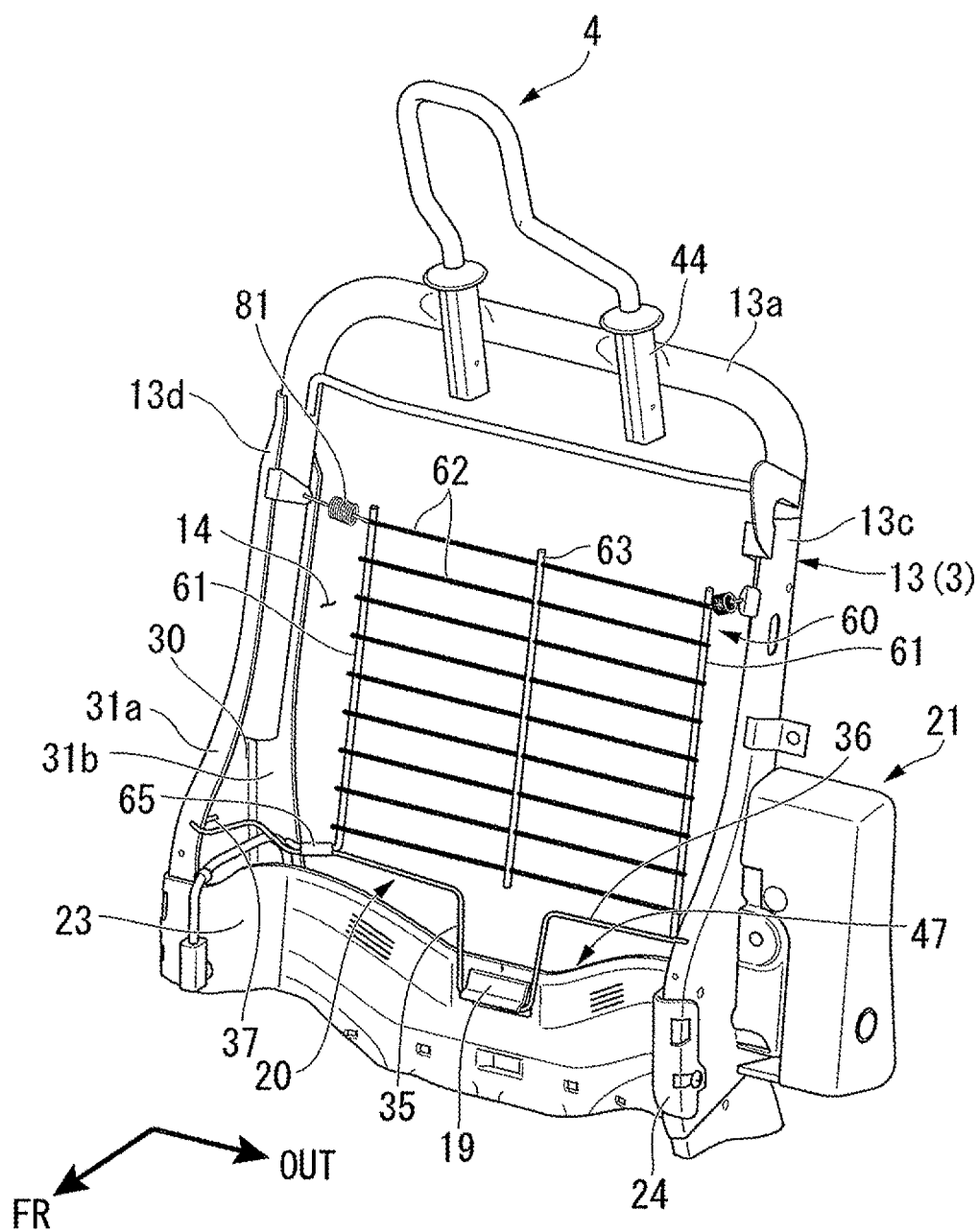
FIG. 11 is a diagram showing another configuration of a planar elastic body, and is a perspective view of a skeletal part of a seat back.

For example, as shown in FIG. 11, a configuration is possible in which an upper end of the bolster wire 61 on the planar elastic body 60 is connected to the side frames 13c, 13d and the like via an elastic member such as a coil spring 81 and the like.

Figure 12:
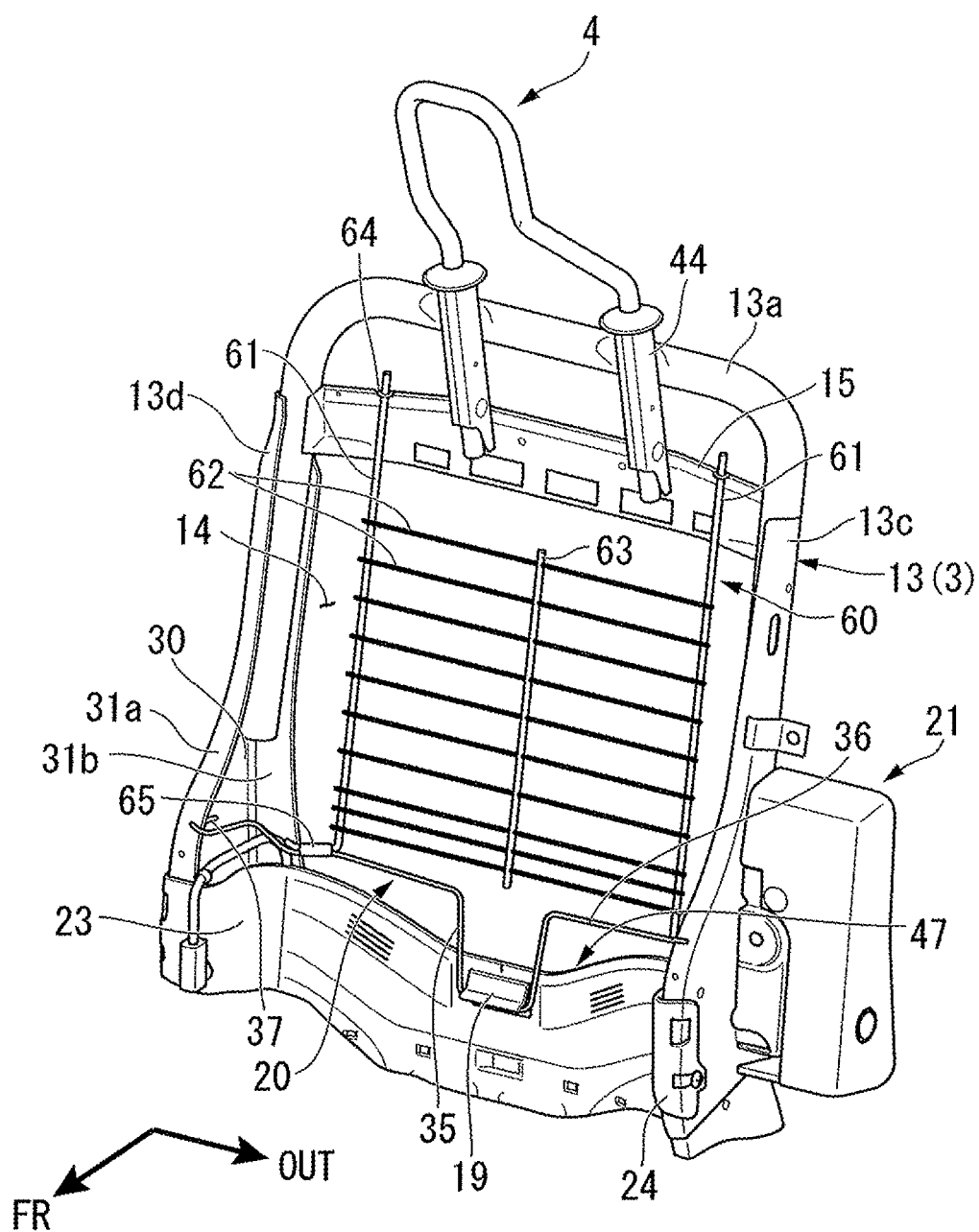
FIG. 12 is a diagram showing another configuration of a planar elastic body, and is a perspective view of a skeletal part of a seat back.

In addition, according to the embodiment described above, a case was described in which a pitch between each stringer wire 62 was made equal. However, the present invention is not limited to this configuration. As shown in FIG. 12, the pitch of the stringer wire 62 may be configured such that the pitch is smaller at a lower portion compared to an upper portion. In this case, the rigidity of the planar elastic body 60 is set to become gradually higher in steps from the upper portion towards the lower portion. Therefore, a change in the rigidity may become more gradual from the supporting body wire 20 to the planar elastic body 60. As a result, the comfort level of the passenger m may be further enhanced.

Furthermore, according to the present embodiment, the planar elastic body 60 was used as a planar elastic body of the present invention. Moreover, the supporting body wire 20 was used as a connection member. However, the present invention is not limited to this configuration as long as an elastic bridge may be made across the opening 14.

The present invention is not to be considered as being limited by the foregoing description, and is only limited by the scope of the appended claims.

What is claimed is:

1. A seat back frame for a seat of a vehicle, the seat back frame comprising:
   a pair of side frames placed at a left side and a right side in a width direction of a seat;
   an upper portion cross member disposed between an upper portion of the side frames;
   a supporting plate extending between and interconnecting a lower portion of the side frames;
   an upper opening defined between the side frames, the upper portion cross member, and the supporting plate and relatively above the supporting plate, the upper opening being opened in a front-rear direction;
   a planar elastic body extending across the upper opening; and
   a connection member elastically connecting a lower portion of the planar elastic body to an upper portion of the supporting plate;
   wherein said planar elastic body is configured to have a lower rigidity as compared to said connection member such that, in the event of a rear end collision, said planar elastic body undergoes greater elastic deformation toward a rear side than does said connection member, and
   wherein the connection member comprises a wire member, said wire member being connected, at each end, to the side frames and, at an intermediate portion located between the ends, to the supporting plate.

2. The seat back frame according to claim 1, wherein the supporting plate includes a hook, and wherein the intermediate portion of the wire member latches with the hook.

3. The seat back from according to claim 1, further comprising an upper frame part and a head rest, said upper frame part being formed in an upside-down U-shape and having legs that are connected to the side frames and between which the upper portion cross member is disposed, said headrest being mounted to the upper frame part and extending upwardly therefrom.

4. The seat back from according to claim 1, wherein the planar elastic body is mounted between the upper portion cross member and the supporting plate so as to be received in the upper opening and spaced laterally inwardly from the side frames.

5. The seat back frame according to claim 1, wherein an upper portion of the planar elastic body is connected to the upper portion cross member.

6. A seat back frame for a seat of a vehicle, the seat back frame comprising:
   a pair of side frames placed at a left side and a right side in a width direction of a seat;
   an upper portion cross member disposed between an upper portion of the side frames;
   a supporting plate extending between and interconnecting a lower portion of the side frames;
   an upper opening defined between the side frames, the upper portion cross member, and the supporting plate and relatively above the supporting plate, the upper opening being opened in a front-rear direction;
   a planar elastic body extending across the upper opening; and
   a connection member elastically connecting a lower portion of the planar elastic body to an upper portion of the supporting plate,
   wherein
   said planar elastic body is configured to have a lower rigidity as compared to said connection member such that, in the event of a rear end collision, said planar elastic body undergoes greater elastic deformation toward a rear side than does said connection member,
   the connection member includes a wire member connected to the pair of side frames, the wire member being elongated along the width direction of the seat,
   a hook is provided to the supporting plate, the hook latching with the wire member,
   the wire member includes:
      a latching part formed in a crank shape, both ends of the latching part being elongated upwards, and the latching part being latched to the hook; and
      an elongating part elongated along the width direction of the seat, and the planar elastic body is connected to the elongating part.

7. The seat back from according to claim 6, further comprising an upper frame part and a head rest, said upper frame part being formed in an upside-down U-shape and having legs that are connected to the side frames and between which the upper portion cross member is disposed, said headrest being mounted to the upper frame part and extending upwardly therefrom.

8. The seat back from according to claim 6, wherein the planar elastic body is mounted between the upper portion cross member and the supporting plate so as to be received in the upper opening and spaced laterally inwardly from the side frames.

9. The seat back frame according to claim 6, wherein an upper portion of the planar elastic body is connected to the upper portion cross member.

* * * * *